United States Patent
Smithson

(10) Patent No.: US 6,343,760 B1
(45) Date of Patent: Feb. 5, 2002

(54) WEBBING SENSOR

(75) Inventor: Alan George Smithson, Wetheral (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/529,578

(22) PCT Filed: Oct. 14, 1998

(86) PCT No.: PCT/GB98/03083

§ 371 Date: Apr. 14, 2000

§ 102(e) Date: Apr. 14, 2000

(87) PCT Pub. No.: WO99/21739

PCT Pub. Date: May 6, 1999

(30) Foreign Application Priority Data

Oct. 28, 1997 (GB) ................................................. 9722781

(51) Int. Cl.[7] ............................................... B60R 22/38
(52) U.S. Cl. ................................................... 242/383.2
(58) Field of Search ...................... 242/383.2, 383.4, 242/383.5; 280/806; 297/478

(56) References Cited

U.S. PATENT DOCUMENTS

| | | | | | |
|---|---|---|---|---|---|
| 4,230,289 A | * | 10/1980 | Fohl | ........................ | 242/383.2 |
| 4,293,106 A | * | 10/1981 | Standing | .................. | 242/383.4 |
| 4,518,131 A | * | 5/1985 | Butenop et al. | ......... | 242/383.2 |
| 4,603,819 A | * | 8/1986 | Loose et al. | ............. | 242/383.4 |
| 5,529,258 A | | 6/1996 | Dybro et al. | | |
| 5,687,926 A | * | 11/1997 | Park et al. | ................ | 242/383.4 |
| 5,931,402 A | * | 8/1999 | Weller | ...................... | 242/383.2 |

FOREIGN PATENT DOCUMENTS

| | | |
|---|---|---|
| DE | 27 54 155 A | 6/1979 |
| DE | 32 46 390 A | 6/1984 |
| FR | 2 696 694 A | 4/1994 |
| GB | 1 052 232 A | 12/1966 |
| GB | 1 586 594 | 3/1981 |
| GB | 2 073 578 A | 10/1981 |
| GB | 2 113 529 | 8/1983 |
| GB | 2 154 853 A | 9/1985 |

* cited by examiner

Primary Examiner—John M. Jillions
(74) Attorney, Agent, or Firm—Markell Seitzman

(57) ABSTRACT

A webbing sensor for a vehicle safety restraint retractor. The sensor comprises an inertial member, mounted for rotation coaxially with a retractor spool, a pawl for engaging the spool and locking it against rotation under emergency conditions, and a calibration spring biasing the inertial disc so that it tends to rotate with the spool unless there is a sudden acceleration or deceleration of a value such as to overcome the resilience of the spring. The spring is connected to the spool via the pawl so that relative rotation between the disc and the spool results in movement of both ends of the spring, preferably by approximately the same distance.

Throughout the locking procedure, the spring force remains substantially constant and thus the bias torque on the inertia disc remains substantially constant, and the locking performance of the sensor is improved.

10 Claims, 3 Drawing Sheets

WEBBING SENSOR

BACKGROUND AND SUMMARY OF THE INVENTION

The present invention relates to a webbing sensor for a vehicle safety restraint retractor.

A webbing sensor is used to lock a retractor against pay out of seat belt webbing when it detects a sudden accelerating force on the webbing indicative of a sudden forward movement of the vehicle occupant such as would happen in an emergency situation.

Typically a webbing sensor is formed of an inertial disc or part of a disc mounted coaxially with the spool of a retractor and connected thereto by a spring. In normal use of the seat belt the disc will rotate with the spool as webbing is payed out or wound onto the spool. However a sudden change in the speed of rotation of the spool in the paying out direction results in a phase difference between the disc and the spool, i.e. the disc lags behind the spool. The disc is connected to a pawl and when this lag occurs it moves the pawl radially outwardly to engage teeth on the lockcup and thereby lock the spool against further rotation and hence against further pay out of webbing thus securing the vehicle occupant against further forward movement.

One problem with the sensor is that the resilience of the spring increases as it is compressed. This means that the locking action is not as quick and clean as would ideally be desired.

It is an object of the present invention to provide an improved webbing sensor.

According to the present invention there is provided a webbing sensor for a vehicle safety restraint retractor, the retractor comprising a rotatable spool on which seat belt webbing is wound, and means for biasing the spool in a webbing rewind direction, the sensor comprising:

an inertial member, mounted for rotation coaxially with the spool, a pivotally mounted locking pawl for engaging the spool and locking it against rotation under emergency conditions, a calibration spring biasing the inertial disc so that it tends to rotate with the spool unless there is a sudden acceleration or deceleration of a value such as to overcome the resilience of the spring, wherein the spring is connected between the inertial member and the pawl.

According to a preferred embodiment the spring is connected so that relative rotation between the inertial member and the spool results in movement of both ends of the spring, and preferably by approximately the same distance.

Hence throughout the locking procedure, the spring force remains substantially constant and thus the bias torque on the inertia disc remains substantially constant and the locking performance of the sensor is improved. Additionally, with this geometry, the mass of the disc can be made smaller than in traditional sensors resulting in a production cost saving. A reduction of 20% in the mass of the disc results in only a 5% reduction in the inertia of the disc, because the mass of the disc can be concentrated at its periphery. This also allows use of plastics material instead of metal for the disc.

Preferably the locking pawl is pivotally mounted on the spool at a point offset from the axis of rotation of the spool and comprises a transversely extending lug adapted to engage in a channel formed in the inertial member. The spring may be located in a recess in the inertial member and the channel may extend off this recess.

According to another aspect of the invention, the sensor is constructed as an assembled unit which can be fitted to the retractor as a self contained sub-assembly. This is in contrast to the traditional sensor which is constructed in the retractor by the assembly of individual components during assembly of the retractor. Constructing the disc, spring and the pawl as a sub-assembly in this way greatly simplifies the production process and leads to cost savings. Previous designs had the spring anchored to the spool and thus could not be sub-assembled.

BRIEF DESCRIPTION OF THE DRAWINGS

For a better understanding of the present invention and to show how the same may be carried into effect, reference will now be made, by way of example, to the accompanying drawings, in which.

DETAILED DESCRIPTION OF THE DRAWINGS

The vehicle sensor of the invention may be incorporated into any of a variety of designs of standard safety restraint retractors in a manner evident to a person skilled in the field.

Figure 1:
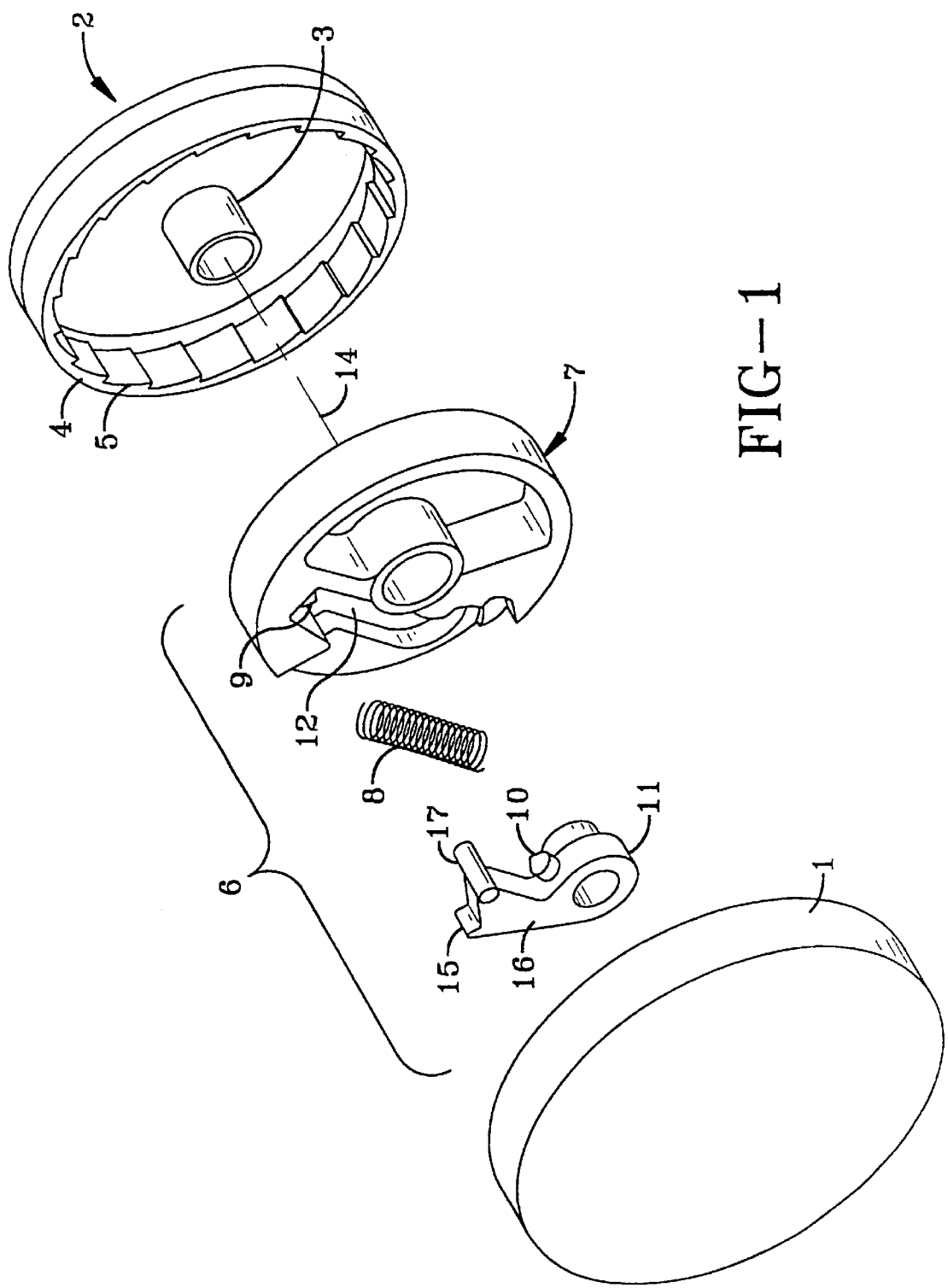
FIG. 1 is an exploded view of a vehicle sensor according to the present invention.

In FIG. 1, an one end of a retractor spool 1 is shown. This is rotatably attached to a lockcup 2 by a shaft of the spool (not shown) which lies along the axis 14 and passes through a central axis hole 3 in the lockcup 2. The lockcup 2 has a rim 4 with internal locking teeth 5. A locking pawl is mounted on the spool and when it engages these lockcup locking teeth 5 the lockcup 2 is held against rotation and in turn the spool 1 is prevented from rotating and payout of seat belt webbing is inhibited.

Located in the cavity between the end of the spool 1 and the lockcup 2 is a webbing sensor 6 which is sensitive to sudden changes in the webbing speed, for example to rapid acceleration or deceleration. This sensor 6 comprises an inertial disc 7 rotatably mounted to the spool shaft. A spring 8 is connected at one end to a spring boss 9 in a recess 12 of the inertial disc 7. At its other end it is connected to a spring boss 10 on the locking pawl 11. The locking pawl 11 is pivotally mounted on the spool, offset from the spool shaft 13 (see FIG. 2). The boss 9 is located in the recess 12 of the disc 7. The locking pawl 11 has an arm 16 extending generally radially outwardly, ending in a locking tooth 15. Spaced from the tooth 15 is a lug 17 which engages in a side channel 18 extending off the recess 12 in the inertial disc 7. The lug 17 cooperates with the side channel 18 in a cam-cam follower manner.

Figure 2:
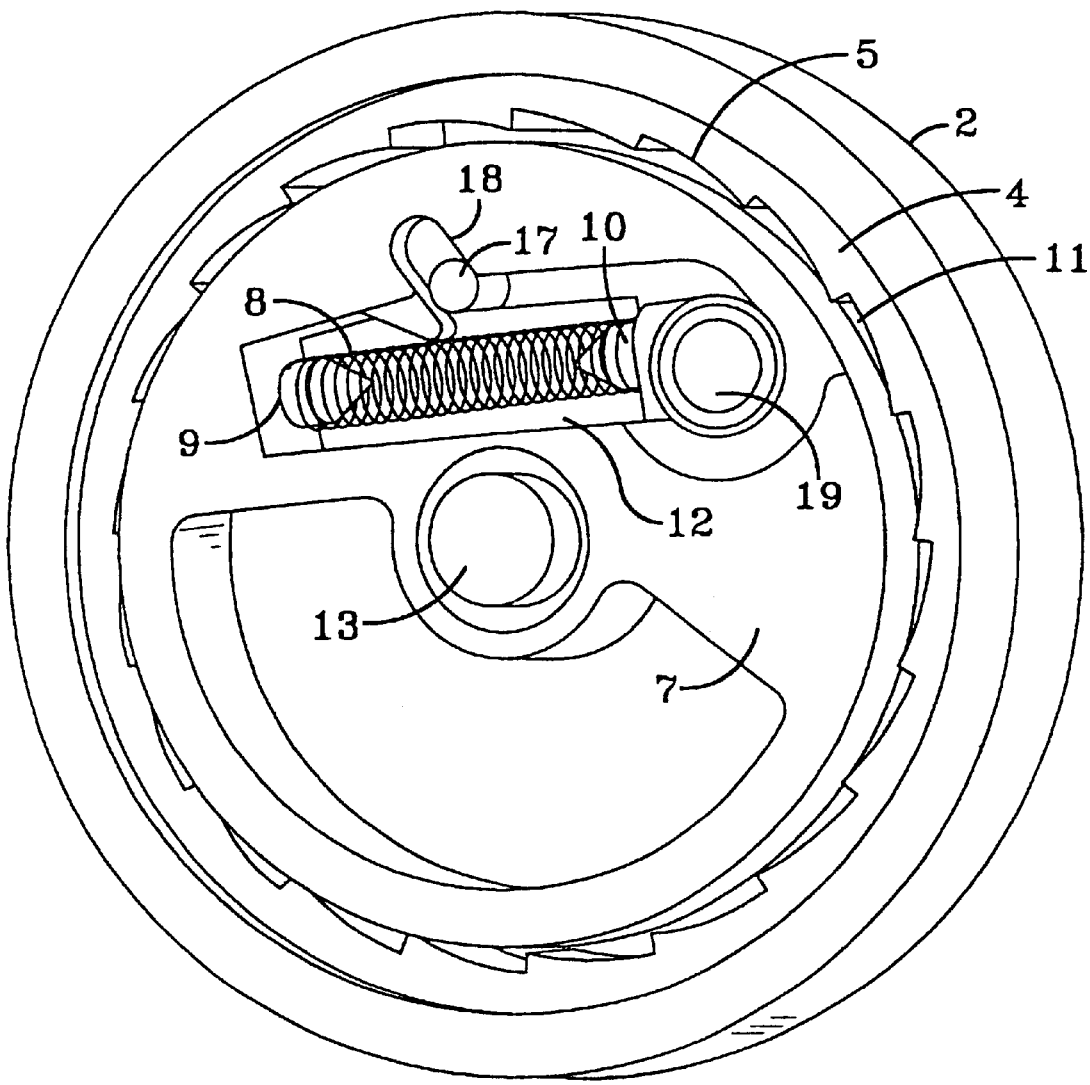
FIG. 2 is a semi-oblique cross-sectional view of the vehicle sensor of FIG. 1, in a non-activated condition with the spool unlocked.
Figure 3:
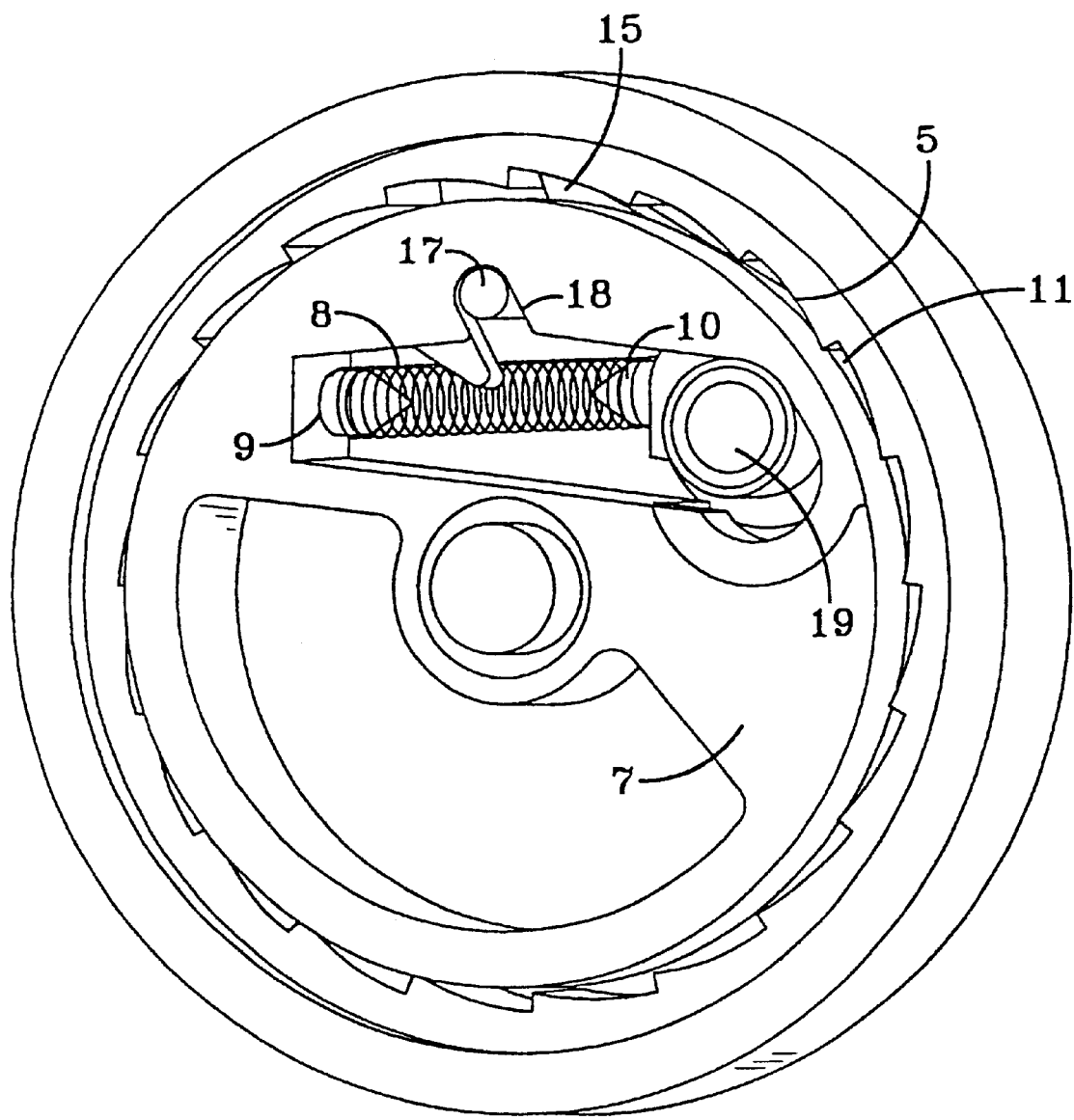
FIG. 3 is a semi-oblique cross-sectional view of the vehicle sensor of FIGS. 1 and 2, in an activated condition with the spool locked.

FIGS. 2 and 3 show the sensor in an assembled state with like parts referenced with like numerals. The spring 8 is clearly seen connected between the spring boss 9 on the inertial disc, and the spring boss 10 on the locking pawl 11. The pawl 11 is partly obscured in FIG. 2 since in this view it is mostly behind the inertial disc 7. The spool shaft 13 is shown on which the lockcup and the inertial disc are mounted.

FIG. 2 illustrates the condition with the sensor inactivated and the pawl 11 in the non-locking position. Thus the locking tooth 15 (not visible) is not engaged with the teeth 5 of the lockcup 2 and the spool 1 is free to rotate and to pay out seat belt webbing in a normal manner.

In FIG. 3 the locked position is shown in which the sensor is activated and pawl 11 has moved such that its locking tooth 15 is engaged with the teeth 5 of the lockcup 2 and the spool 1 is prevented from rotating and paying out seat belt webbing. The pawl 11 has moved constrained by the lug 17 in guide channel 18 and by the boundary of recess 12 in disc 7. As the pawl 11 moves, the spring 8 also moves slightly (as can be seen from a comparison of FIGS. 2 and 3). However the spring 8 is not significantly compressed during this movement and thus the spring load remains substantially constant. Hence there is no significant increase in resistance to the movement of the disc 7 into the locking position and the locking action is smooth. In this way at least one of the disadvantages of the known arrangement is overcome.

Of course a variety of geometries will achieve a similar result and although only one is described as an example here. A person skilled in the art will be able to adapt the arrangement to a particular retractor and vehicle situation, taking care that the spring does not become significantly compressed during the locking process.

What is claimed is:

1. A webbing sensor for a vehicle safety restraint retractor, the retractor comprising a rotatable spool on which seat belt webbing is wound, and means for biasing the spool in a webbing rewind direction, the sensor comprising:
an inertial member, adapted to rotate with the spool,
a pivotally mounted locking pawl for engaging the spool and locking it against rotation under emergency conditions,
a calibration spring biasing the inertial member so that it tends to rotate with the spool unless there is a sudden acceleration or deceleration of a value such as to overcome the resilience of the spring,
wherein the spring is connected between the inertial member and the pawl, so that relative rotation between the inertial member and the spool results in movement of both ends of the spring by approximately the same distance.

2. A webbing sensor according to claim 1 wherein the locking pawl is pivotally mounted on the spool at a point offset from the axis of rotation of the spool.

3. A webbing sensor according to claim 2 wherein the locking pawl comprises a transversely extending lug adapted to engage in a channel formed in the inertial member.

4. A webbing sensor according to claim 1 wherein the inertial member comprises a recess and the spring is located in the recess.

5. A webbing sensor according to claim 4 wherein the channel extends off the recess.

6. A webbing sensor according to claim 1 wherein a major portion of the mass of the inertial member is located generally in the region of its periphery.

7. A webbing sensor according to claim 1 wherein the inertial member is generally disc shaped.

8. A webbing sensor according to claim 1 wherein the inertial member is formed of plastic material.

9. A webbing sensor according to claim 1 wherein the spring is not anchored directly to the spool.

10. A webbing sensor according to claim 1 wherein the sensor is constructed as an assembled unit adapted to be fitted to a retractor as a self-contained sub-assembly.

* * * * *